United States Patent
Mamba

(10) Patent No.: US 7,454,994 B2
(45) Date of Patent: Nov. 25, 2008

(54) REVERSE GEAR SYSTEM FOR MOTORCYCLE

(75) Inventor: Ichiro Mamba, Narita (JP)

(73) Assignee: Mamba Inc., Tokyo (JP)

( * ) Notice: Subject to any disclaimer, the term of this patent is extended or adjusted under 35 U.S.C. 154(b) by 328 days.

(21) Appl. No.: 11/484,607

(22) Filed: Jul. 12, 2006

(65) Prior Publication Data

US 2007/0022833 A1 Feb. 1, 2007

(30) Foreign Application Priority Data

Jul. 27, 2005 (JP) .............................. 2005-217172

(51) Int. Cl.
*F16H 3/34* (2006.01)

(52) U.S. Cl. ....................................................... 74/352

(58) Field of Classification Search .................... 74/321, 74/352, 355; 180/230
See application file for complete search history.

(56) References Cited

U.S. PATENT DOCUMENTS 2,978,201 A * 4/1961 Polevoy ...................... 242/255
3,204,488 A * 9/1965 De Valliere .................. 74/745

* cited by examiner

*Primary Examiner*—Dirk Wright
(74) *Attorney, Agent, or Firm*—Oblon, Spivak, McClelland, Maier & Neustadt, P.C.

(57) ABSTRACT

A reverse gear system for a motorcycle includes a shifter for rotatably supporting the idler gear, locating the idler gear in a separation position to disengage the idler gear from the main-shaft-side gear when the shifter is set in a retracted position, and for locating the idler gear in an engagement position to engage the idler gear with the main-shaft-side gear when the shifter is set in a forward position; and a holding unit for provisionally holding the shifter selectively in a state with the shifter being set in the retracted position and in a state with the shifter being set in the forward position. The idler gear is combined with the shifter so that the idler gear has a shaft member formed thereon so as to be rotatably inserted in bearing apertures formed in the shifter. The bearing apertures are formed so as to have a length along a shifting direction of the shifter, the length being larger than a diameter of the shaft member.

1 Claim, 7 Drawing Sheets

REVERSE GEAR SYSTEM FOR MOTORCYCLE

BACKGROUND OF THE INVENTION

1. Field of the Invention

The present invention relates to an improvement in the reverse gear system used in a motorcycle.

2. Discussion of Background

It is difficult to push a large motorcycle backward, i.e., to move a large motorcycle backward by human power. For this reason, a reverse gear system as shown in FIG. 6 and FIG. 7 has been provided as an optional part for a motorcycle.

In these figures, reference numeral 100 designates a main-shaft-side gear, which is coupled to the main-shaft in the gearbox of a motorcycle not shown. Reference numeral 101 designates a countershaft-side gear, which is coupled to the countershaft in the gearbox of the motorcycle. Reference numeral 102 designates an idler gear. Reference numeral 103 designates a shifter. Reference numeral 104 designates a ball, which is put, under the resilient force of a spring 105, into recesses 103a formed at upper and lower positions of the shifter 103 so that the ball selectively and provisionally holds the shifter 103 in a retracted position and in a forward position. When the motorcycle is driven backward, the reverse gear system is put in an ON position by pushing the shifter into the forward position from the retracted position with the gearbox being shifted to neutral to disengage the clutch. When the shifter has been pushed into the forward position, the idler gear is engaged with the main-shaft-side gear 100 as shown in FIG. 7. Accordingly, when the clutch is engaged, the countershaft-side gear is reversely rotated to make the rear wheel of the motorcycle rotated in the direction to drive the motorcycle backward.

In order to avoid inadvertent damage in, e.g., a case where the gearbox is shifted, by inadvertent operation, to a low-gear with the reverse gear system being put in the ON position (being put in the position shown in FIG. 7), in other words, with the motorcycle being driven backward, the conventional reverse gear system is configured so that a force is applied to the idler gear 102 to disengage the idler gear from the main-shaft-side gear 100 to release, from the ball 104, the shifter 103 provisionally held in the forward position, thereby shifting the shifter 103 to the retracted position. Accordingly, in a case where the motorcycle is driven backward at a high speed, where the motorcycle is driven backward downhill, or where the accelerator is depressed during backward driving, when a difference having a certain value or above is caused between the torque of the main shaft and the torque of the countershaft (in other words, when a strong engine brake having a certain value or above is activated), the shifter 103 has been shifted to the retracted position as in the case where inadvertent operation is done. In such a case, a motorcycle rider has been obliged to depress the shifter 103 into the forward position again.

SUMMARY OF THE INVENTION

It is an object of the present invention to provide a reverse gear system for a motorcycle, which after having been put in an OFF position, is capable of being put in an ON position without operating a shifter when a difference having a certain value or above is lost between the torque of the main shaft and the torque of the countershaft after such a difference having a certain value or above has been caused with the motorcycle being driven backward by use of the reverse gear system.

In order to solve the problem, the present invention provides a reverse gear system for a motorcycle comprising:

(1) a main-shaft-side gear coupled to a main shaft in a gearbox of a motorcycle;

(2) a countershaft-side gear coupled to a countershaft in the gearbox of the motorcycle;

(3) an idler gear constantly engaged with the countershaft-side gear;

(4) a shifter for rotatably supporting the idler gear, locating the idler gear in a separation position to disengage the idler gear from the main-shaft-side gear when the shifter is set in a retracted position, and for locating the idler gear in an engagement position to engage the idler gear with the main-shaft-side gear when the shifter is set in a forward position; and (5) a holding unit for provisionally holding the shifter selectively in a state with the shifter being set in the retracted position and in a state with the shifter being set in the forward position;

(6) wherein the idler gear is combined with the shifter so that the idler gear has a shaft member formed thereon so as to be rotatably inserted in bearing apertures formed in the shifter; and (7) the bearing apertures are formed so as to have a length along a shifting direction of the shifter, the length being larger than a diameter of the shaft member.

When the reverse gear system is in an OFF state, i.e., when the shifter is set in the retracted position to locate the idler gear in the separation position, the idler gear is rotated along with the countershaft-side gear, which is forwardly rotated. When the motorcycle needs to be backwardly driven, the shifter is depressed toward the forward position to locate the idler gear in the engagement position, and the idler gear is held in the engagement position by the holding unit (wherein the reverse gear system is set in an ON position). Thus, the drive force of the main-shaft-side gear is transmitted to the countershaft-side gear through the idler gear to reverse the rotation of the countershaft-side gear. Accordingly, the rear wheel of the motorcycle is rotated in a direction to drive the motorcycle backward. When a difference having a certain value or above is caused between the torque of the main-shaft and the torque of the countershaft with the reverse gear system being put in the ON position (in other words, when an engine brake is activated at a certain value or above), a force is applied to disengage the idler gear from the main-shaft-side gear, i.e., to shift the idler gear to the separation position. In the reverse gear system according to the present invention, the idler gear is supported so as to be movable in the shifting direction of the shifter, i.e., with play, by the bearing apertures. Accordingly, when a force is applied to push the idler gear toward the separation position, the idler gear can be shifted in the range of the bearing apertures, preventing the shifter form being shifted toward the retracted position. Thus, in such a case, it is possible to prevent a force from being applied to release the provisional holding of the holding unit, which has located the shifter in the forward position. Accordingly, in such a case, it is possible to prevent the shifter from being returned to the retracted position wherein the idler gear is set in the separation position. More specifically, the idler gear is intermittently reciprocating between the engagement position and the separation position until the difference between the torque of the main-shaft and the torque of the countershaft decreases to a value of not higher than the certain value. When the difference between the torques decreases to a value of not higher than the certain value, the idler gear is steady in the engagement position.

In accordance with the reverse gear system of the present invention, when a difference having the certain value or above is caused between the torque of the main shaft and the torque of the countershaft, the idler gear can escape so as to be disengaged from the main-shaft-side gear, preventing the shifter from being shifted to the retracted position. When such a level of torque difference is lost, the reverse gear system, which has once set in the OFF position, can be reset in the ON position without operating the shifter.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENT

Now, an embodiment of the present invention will be described based on FIG. 1 through FIG. 5.

Figure 1:
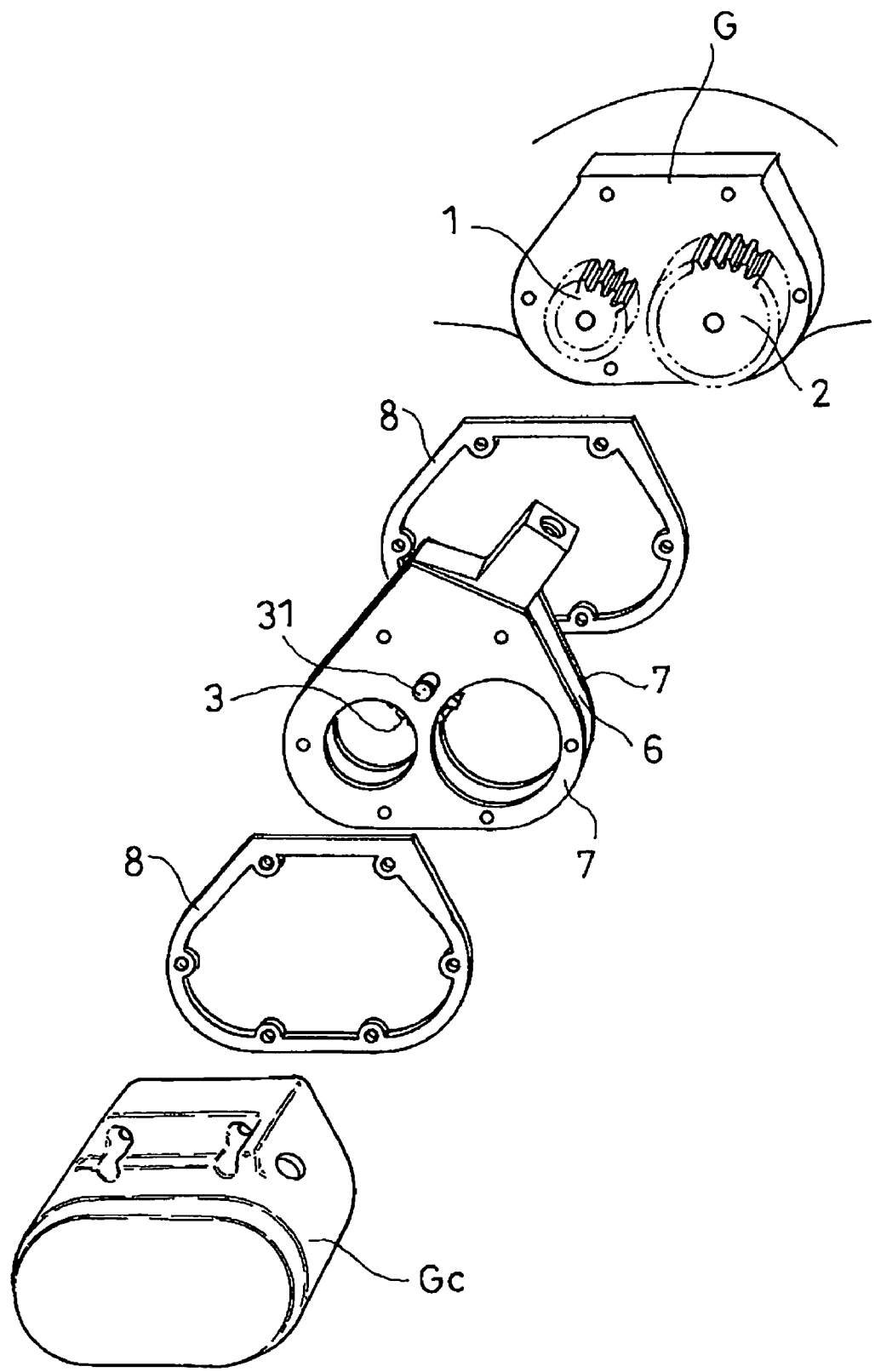
FIG. 1 is an exploded perspective view of a reverse gear system and essential parts of a gearbox.
Figure 2:
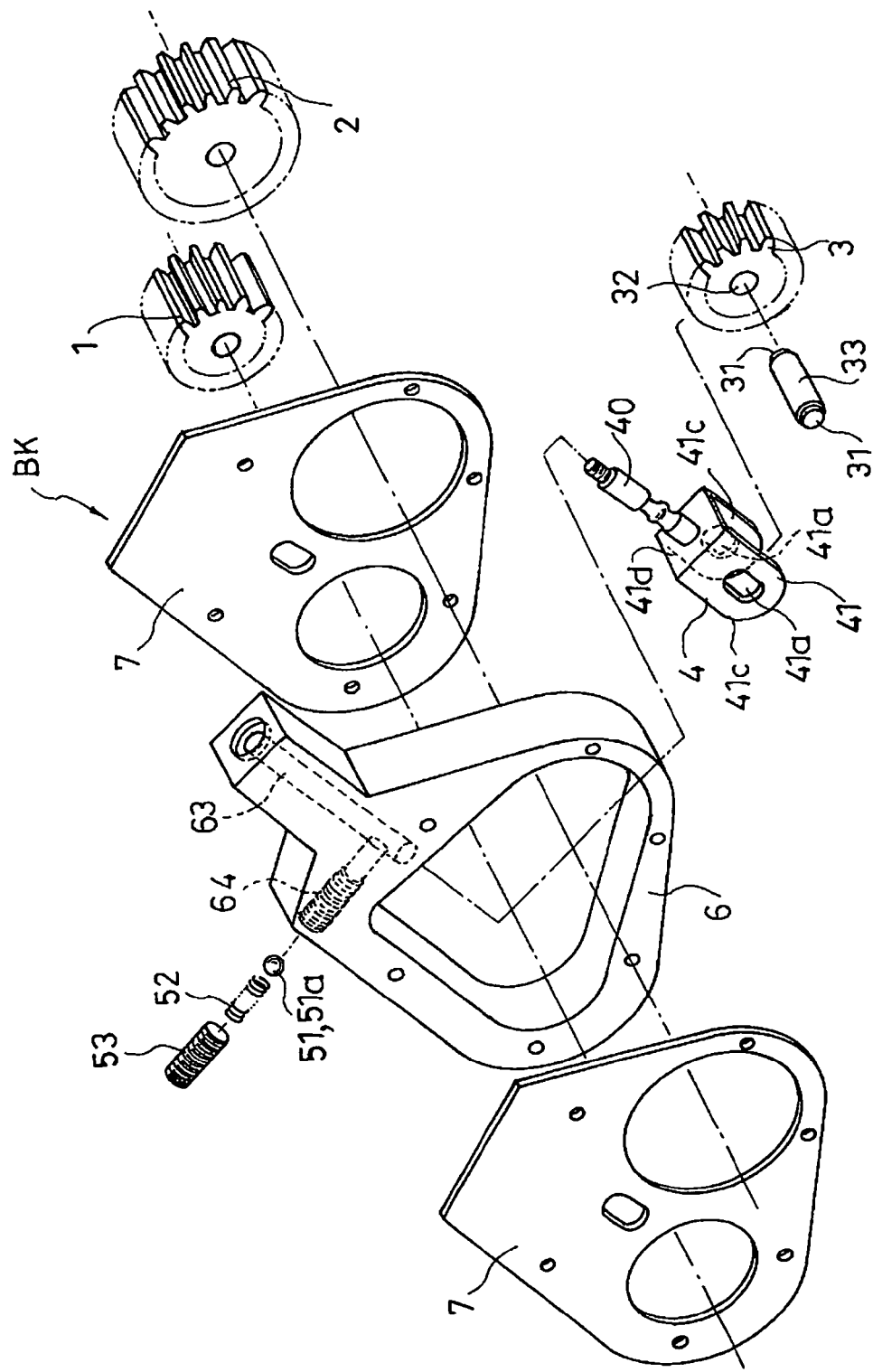
FIG. 2 is an exploded perspective view of the reverse gear system.

FIG. 1 shows essential parts of a known gearbox G as an exploded view in order to easily understand how to mount a reverse gear system Bk to the gearbox. FIG. 2 shows essential parts of the reverse gear system Bk as an exploded view.

Figure 3:
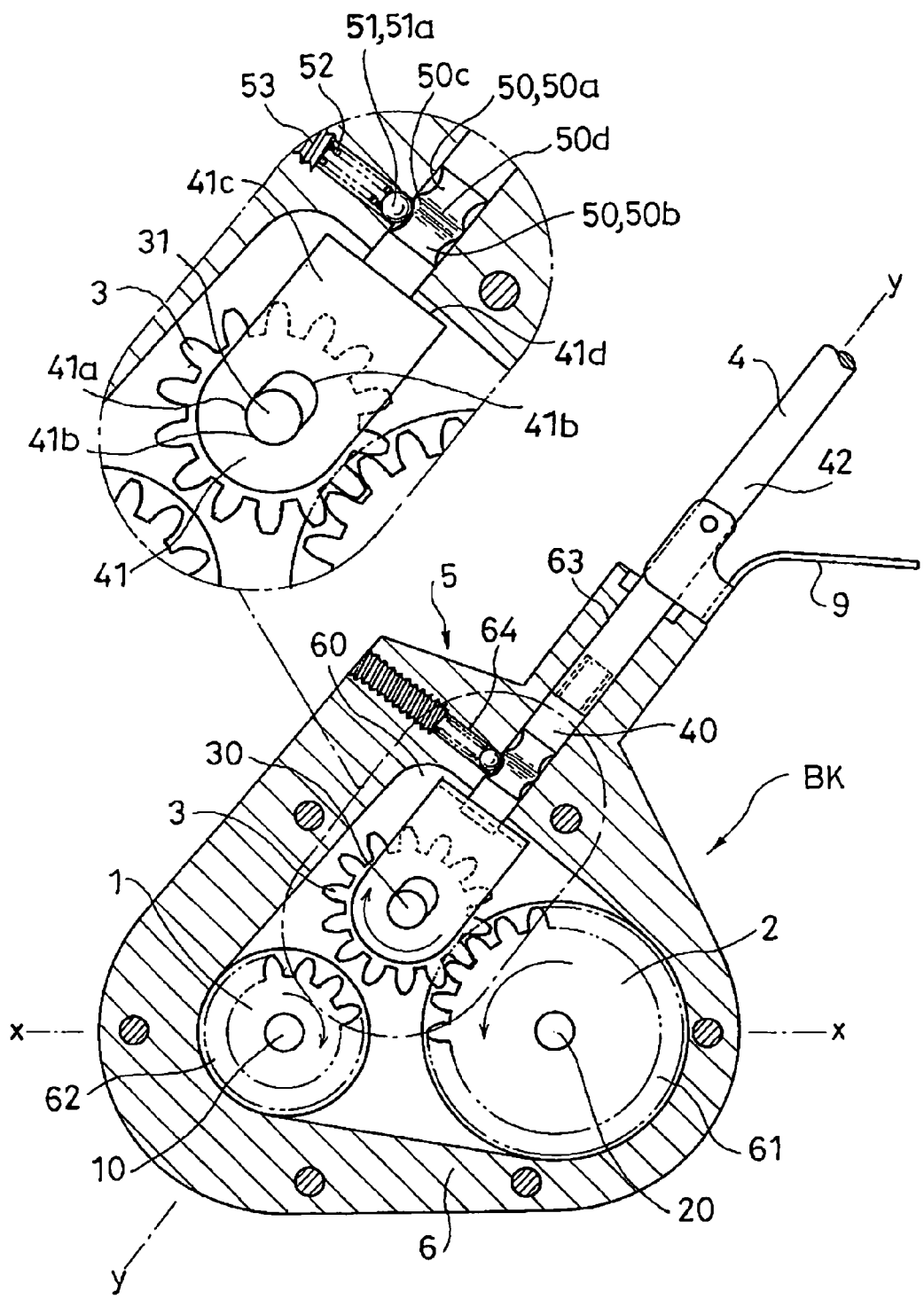
FIG. 3 is a schematic cross-sectional view of essential parts of the reverse gear system, wherein a shifter is set in a retracted position.
Figure 4:
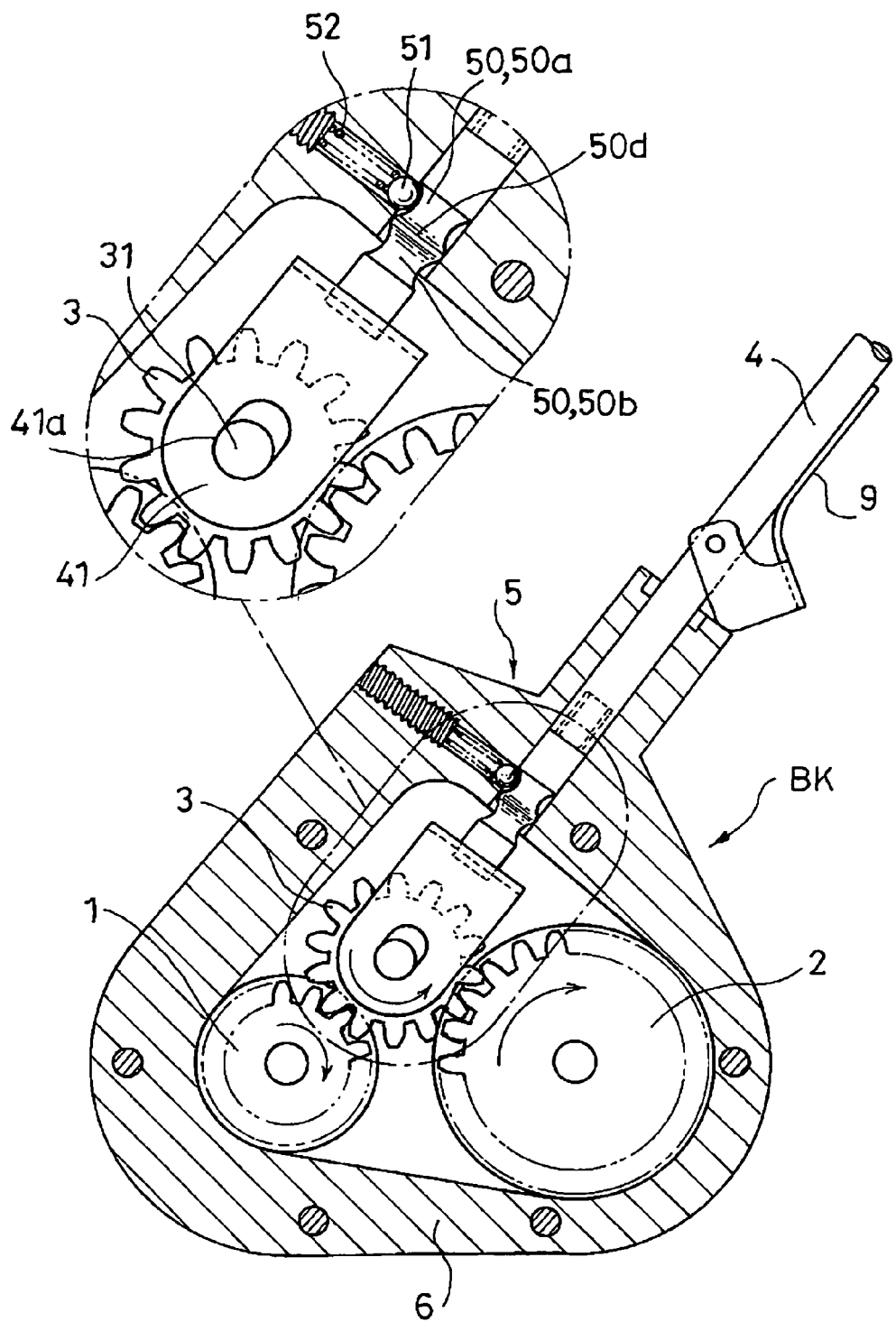
FIG. 4 is a schematic cross-sectional view of the essential parts of the reverse gear system, wherein the shifter is set in a forward position.
Figure 5:
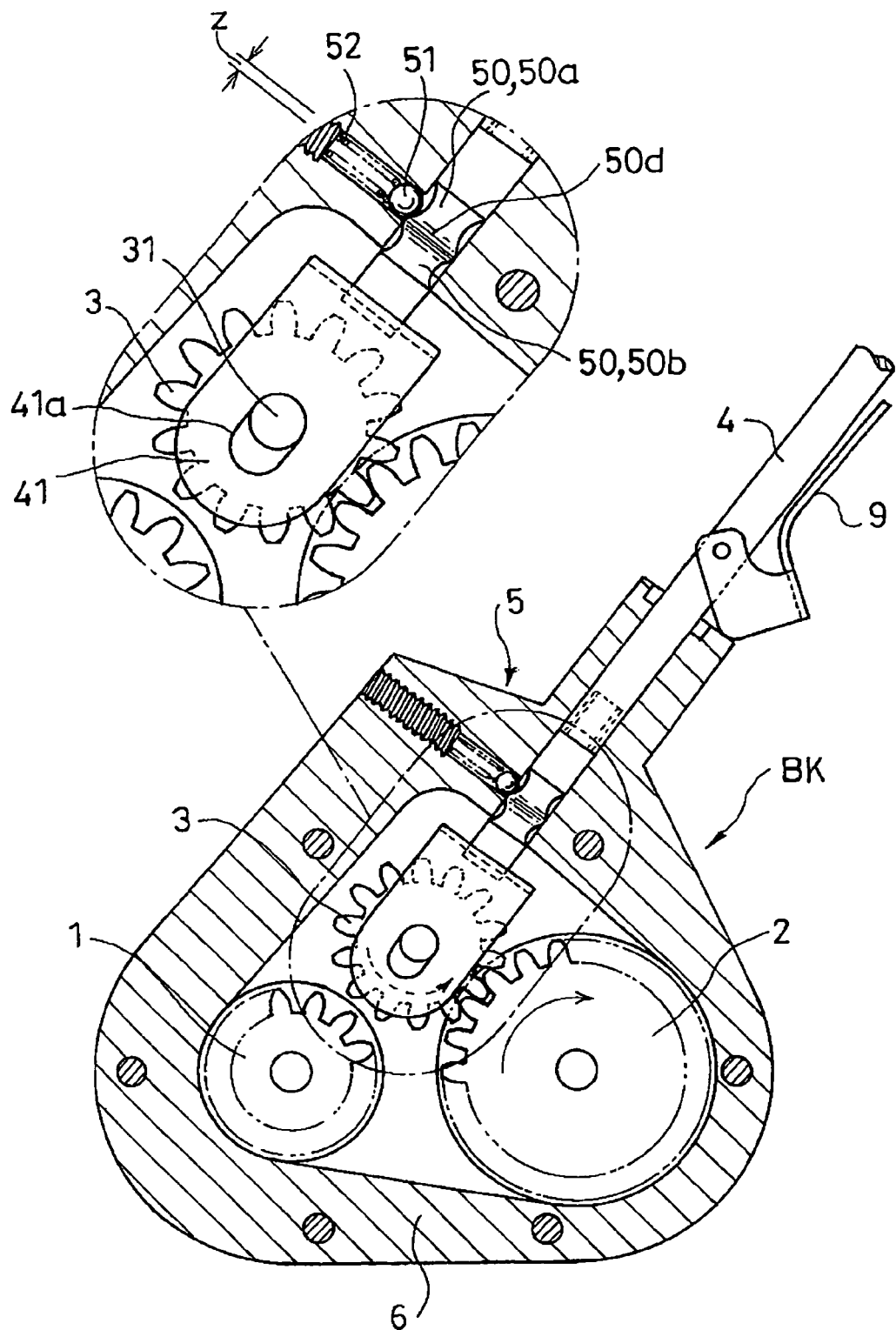
FIG. 5 is a schematic cross-sectional view of the essential parts of the reverse gear system, wherein the shifter is set in the forward position.
Figure 6:
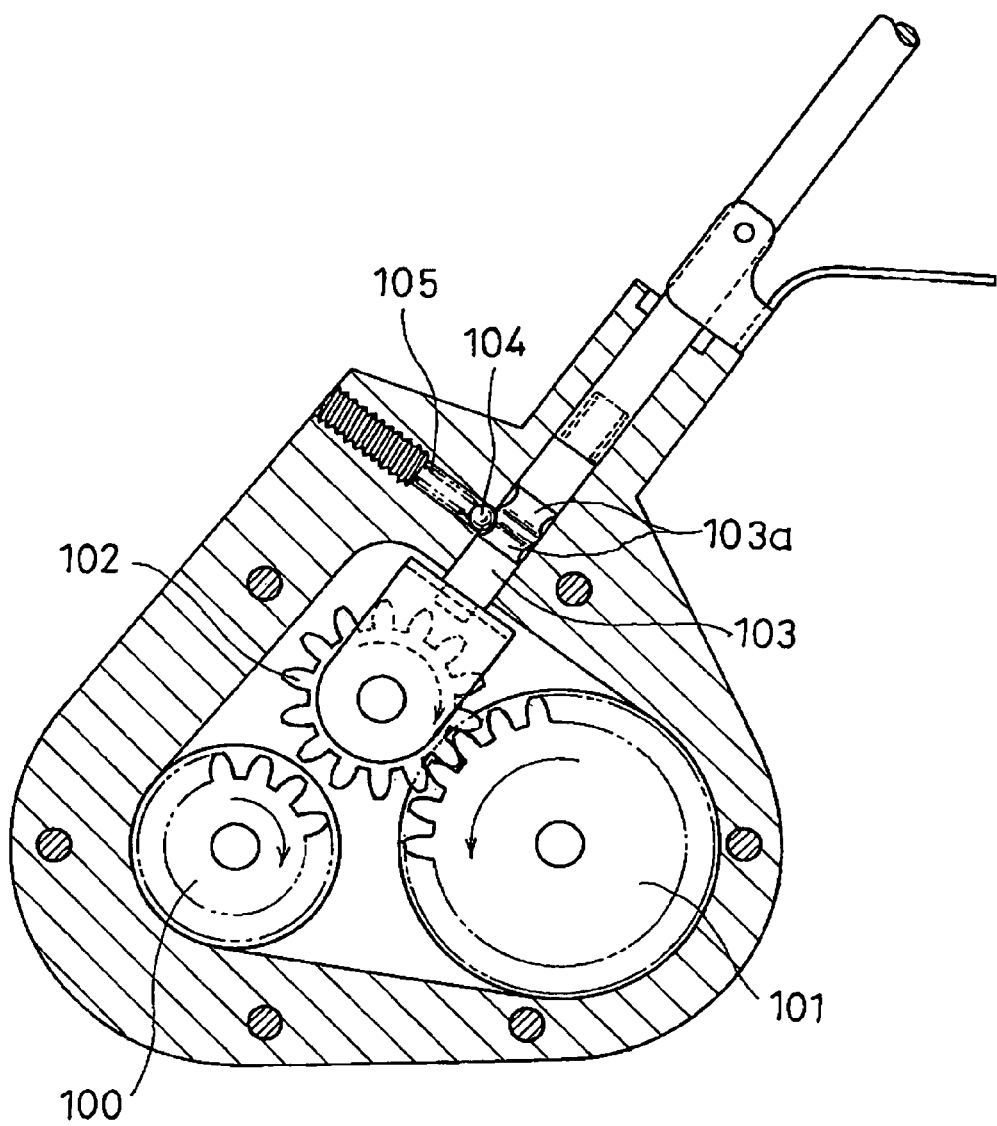
FIG. 6 is a schematic cross-sectional view of a conventional reverse gear system.
Figure 7:
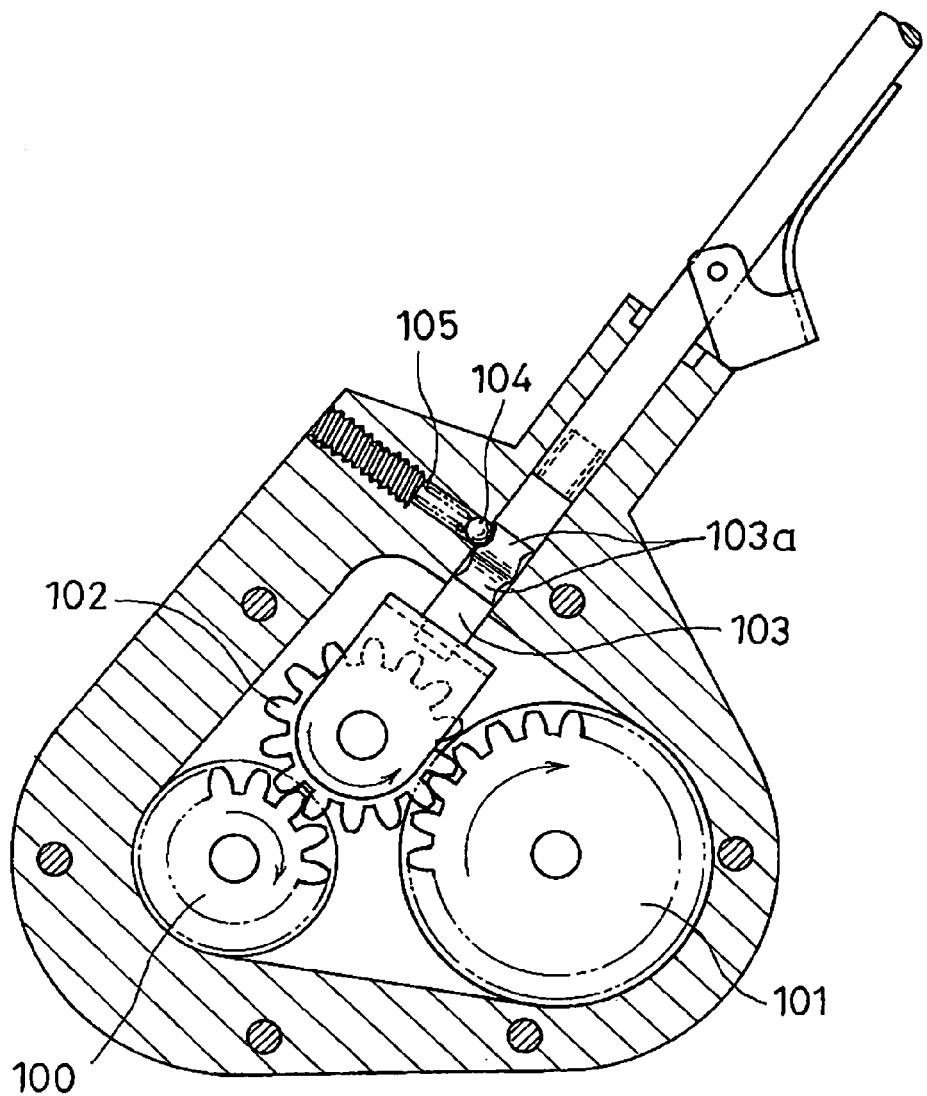
FIG. 7 is a schematic cross-sectional view of the conventional reverse gear system

FIG. 3 shows a state wherein the reverse gear system Bk is put in an OFF position. FIG. 4 shows a state wherein the reverse gear system Bk is put in an ON position. FIG. 5 shows a state wherein a force is applied to an idler gear 3 in a direction to disengage the idler gear 3 form a main-shaft-side gear 1 in the ON position.

The reverse gear system Bk according to this embodiment is used for a motorcycle. Typically, the reverse gear system Bk is used for a two-wheel or three-wheel motorcycle or a motorcycle with a sidecar. The reverse gear system Bk is typically combined with the known gearbox G of a large motorcycle, which is difficult to be backwardly moved by human power. The reverse gear system allows the motorcycle to be backwardly driven by utilizing the power of the engine.

The reverse gear system Bk comprises:

(1) the main-shaft-side gear 1;

(2) a countershaft-side gear 2;

(3) the idler gear 3 constantly engaged with the countershaft-side gear 2;

(4) a shifter 4 for rotatably supporting the idler gear 3, locating the idler gear 3 in a separation position to disengage the idler gear 3 from the main-shaft-side gear 1 when the shifter is set in a retracted position, and for locating the idler gear 3 in an engagement position to engage the idler gear 3 with the main-shaft-side gear 1 when the shifter is set in a forward position; and (5) a holding unit 5 for provisionary holding the shifter selectively in a state with the shifter being set in the retracted position and in a state with the shifter being set in the forward position.

The reverse gear system Bk is typically retrofitted to a motorcycle as shown in FIG. 1. Specifically, the reverse gear system Bk may be retrofitted to the motorcycle as follows:

(1) After the gearbox cover Gc of an existing gearbox G is removed, (2) the main-shaft-side gear 1 is mounted on an end portion of the main shaft (not shown) in the gearbox G, and the countershaft-side gear 2 is mounted on an end portion of the countershaft (not shown) in the gearbox G, (3) then, a reverse gear housing 6 described later is mounted to the main body of the gearbox G so that the main-shaft-side gear 1 and the countershaft-side gear 2 thus mounted are both housed in the reverse gear housing 6, and (4) finally, the gearbox cover Gc is mounted to the gearbox so as to cover the opening of the reverse gear housing 6 remote from the mounting side for the main-shaft-side gear and the countershaft-side gear.

In some of the figures, reference numeral 7 designates side plates, which are respectively mounted to both sides of the reverse gear housing 6, and each of which has an elongated hole to house end portions of shaft members 31 of the idler gear 3 described later. Reference numeral 8 designates gaskets, one of which is sandwiched between one of the side plates 7 and the main body of the gearbox G, and the other of which is sandwiched between the other side plate 7 and the gearbox cover Gc.

In the shown embodiment, the main-shaft-side gear 1 is formed so as to have a smaller diameter than the countershaft-side gear. The main-shaft-side gear 1 is located at a position closer to the rear side of the motorcycle, and the countershaft-side gear 2 is located at a position closer to the front side of the motorcycle. The main-shaft-side gear 1 and the countershaft-side gear 2 are located so that the rotational center 10 of the main-shaft-side gear 1 and the rotation center 20 of the countershaft-side gear 2 are located on substantially the same imaginary horizontal line x. The main-shaft-side gear 1 and the countershaft-side gear 2 are located so as to have a gap in a forward and backward direction of the motorcycle so that the drive force of the main-shaft-side gear 1 is not transmitted to the countershaft-side gear 2 through the idler gear 3 when the idler gear 3 is put in the separation position.

In the shown embodiment, the idler gear 3 comprises a gear, which has substantially the same diameter as the main-shaft-side gear 1. In the shown embodiment, the idler gear 3 is configured so as to be engaged with both of the main-shaft-side gear 1 and the countershaft-side gear 2 from upward when the idler gear is put in the engagement position. When the idler gear 3 is put in the engagement position, the rotation center 30 of the idler gear is located at a higher position than the imaginary horizontal line x, on which the rotation center 10 of the main-shaft-side gear 1 and the rotation center 20 of the countershaft-side gear 2 are located. In the shown embodiment, the idler gear 3 is supported by the shifter 4 so that the idler gear is movable between the separation position and the engagement position substantially along an imaginary oblique straight line y, which ascends toward the front side of the motorcycle.

In the shown embodiment, the shifter 4 comprises a shifter shaft 40 and a supporter 41 for the idler gear 3, which are mounted to a lower end of the shifter shaft 40.

In the shown embodiment, the reverse gear system Bk is constituted by housing the idler gear 3, the countershaft-side gear 2 and the main-shaft-side gear 1 in the reverse gear housing 6 having an internal space formed in a substantially triangular shape therein, so that the idler gear 3 is located in an upper corner 60 of the triangular shape, the countershaft-side gear 2 is located in a front corner 61 of the triangular shape and the main-shaft-side gear 1 is located in a rear corner 62 of the triangular shape. In the shown embodiment, the reverse gear housing 6 has a through hole 63 for the shifter shaft 40, formed therein so as to communicate with the internal space at a position of a side between the upper corner 60 and the front corner 61 of the triangular shape in the vicinity of the upper corner 60 and to extend along the oblique straight line y, the shifter shaft 40 being passed through the through hole 63. When a motorcycle rider depresses the shifter shaft in the forward position by using an operation rod 42 connected to an upper end of the shifter shaft 40, the idler gear 3 is located in the engagement position. When the rider pulls out the shifter shaft to the retracted position, the idler gear 3 is located in the separation position.

In the shown embodiment, the holding unit 5 comprises:

(1) recesses 50 formed at upper and lower positions of the shifter shaft 40 so as to be spaced in a longitudinal direction of the shifter shaft; and (2) a stopper 51, which is constantly and resiliently urged so as to partly project from an inner wall of the through hole 63 of the reverse gear housing 6 in order to be put into either one of the two recess 50 and 50.

In the shown embodiment, the respective recesses 50 and 50 comprise circumferential grooves 50a and 50b formed on the shifter shaft 40. The two circumferential grooves 50a and 50b have a convex partition 50c circumferentially formed on the shifter shaft. One of the groove walls of each of the two circumferential grooves 50a and 50b also serves as a lateral surface of the convex partition 50c, forming an inclined surface 50d.

In the shown embodiment, the stopper 51 comprises a ball 51a, which can have a part of the spherical surface projecting form a lower end of a stopper housing hole 64. The stopper housing hole has the lower end communicating with the through hole 63 of the reverse gear housing 6 and extends in a direction perpendicular to the through hole 63.

In the shown embodiment, the stopper housing hole 64 has a helical compression spring 52 housed therein so as to have a lower end pressed against the ball 51a and an upper end pressed against a worm 53 screwed in an upper end of the stopper housing hole 64. The helical coil spring 52 urges the ball 51a so as to protrude a portion of the spherical surface of the ball to project into the through hole 63.

In the shown embodiment, when the shifter 4 is set in the retracted position, the spring 52 causes the ball 51a to be resiliently put into the lower circumferential groove 50b of the two circumferential grooves 50a and 50b, keeping the shifter 4 held in the retracted position. When the shifter 4 is set in the forward position, the spring 52 causes the ball 51a to be resiliently put into the upper circumferential groove 50a of the circumferential grooves 50a and 50b, keeping the shifter 4 held in the forward position. In other words, when the shifter 4, which has been set in the retracted position, is depressed toward the forward position, the ball 51a is gradually pushed into the stopper housing hole 64 because of the provision of the inclined surface 50d, passes over the convex partition 50c and is put into the upper circumferential groove 50a of the two circumferential grooves 50a and 50b, provisionally holding a state wherein the shifter 4 is set in the forward position. When the shifter 4, which has been set in the forward position, is pulled out toward the retracted position, the ball 51a is gradually pushed into the stopper housing hole 64 because of the provision of the inclined surface 50d, passes over the convex partition 50c and is put into the lower circumferential groove 50b of the two circumferential grooves 50a and 50b, provisionally holding a state wherein the shifter 4 is set in the retracted position.

In the shown embodiment, the groove walls of the two circumferential grooves 50a and 50b close to the convex partition 50c are formed as the inclined surfaces 50d. When a pressure is applied, toward the retracted position, to the shifter 4, which has been put in the forwarded position to locate the idler gear 3 in the engagement position, the stopper 51 allows the shifter shaft 40 to make slight movement, being housed in the upper circumferential groove 50a of the two circumferential grooves 50a and 50b (see FIG. 5).

The shaft members 31, which are formed on the idler gear 3, are rotatably inserted into bearing apertures 41a formed in the shifter 4 to combine the idler gear 3 with the shifter 4. Each of the bearing apertures 41a is formed so as to have a larger length than the diameter of the shaft member 31 in the shifting direction of the shifter 4.

In the shown embodiment, the bearing apertures 41a are formed in the supporter 41 of the shifter 4, and the shaft members 31 are formed so as to pass through the rotation center 30 of the idler gear 3.

In the shown embodiment, the supporter 41 of the shifter 4 comprises a pair of support plates 41c and 41c, and a connection plate 41d extending between top ends of the support plates 41c, the support plates being disposed so as to be spaced from each other by a slightly larger distance than the wall thickness of the idler gear 3. The shifter shaft 40 has a lower edge mounted to an outer surface of the connection plate 41, integrating the supporter 41d with the shifter shaft 40. Each of the bearing apertures 41a is formed in each of the paired support plates 41c and 41c so as to have such an elongated shape that the dimension of each of the bearing apertures in the direction along the oblique straight line y is larger than the dimension of each of the bearing apertures in the direction perpendicular to the oblique straight line y. The width of each of the bearing apertures 41a in the direction perpendicular to the oblique straight line is substantially equal to the diameter of the shaft member 31. The upper edge and the lower edge of each of the bearing apertures 41a are formed as arcuate edges 41b along the outer diameter of the shaft member 31. The bearing aperture 41a formed in one of the paired support plates 41c and 41c, and the bearing aperture 41a formed in the other support plate have the same dimensions and the same shape as each other, and the bearing aperture 41a formed in the one support plate and the bearing aperture 41a formed in the other support plate have the upper edges positioned at the same level as each other and the lower ends portioned at the same level as each other. The idler gear 3 has an idler shaft 33 passed through a hole 32 formed at a central portion thereof around the rotation center. The idler shaft 33 has both edge portions projecting from both sides of the idler gear, and the respective shaft members 31 are formed on the edge portion on one of the sides of the idler gear and on the edge portion on the other side. The idler gear 3 is combined with the supporter 41 of the shifter 4 so that the shift member 31 on the one side is inserted into the bearing aperture 41 formed in one of the paired support plates 41c and 41c, and the shaft member 31 on the other side is inserted into the bearing aperture 41a formed in the other support plate of the paired support plates 41c and 41c.

When the reverse gear system Bk is put in the OFF state, i.e., when the shifter 4 is set in the retracted position to locate the idler gear 3 in the separation position, the idler gear 3 is rotated along with the countershaft-side gear 2, which is forwardly rotating (forward driving in FIG. 3). When the motorcycle needs to be driven backward, the gearbox is shifted to the neutral position to disengage the clutch, the shifter 4 is depressed toward the forward position to locate the idler gear 3 in the engagement position, and the idler gear is kept in this state by the holding unit 5 (the ON state of the reverse gear system Bk). After that, when the clutch is engaged, the drive force of the main-shaft-side gear 1 is transmitted to the countershaft-side gear 2 through the idler gear 3 to reverse the rotation of the countershaft-side gear 2 (see FIG. 4). Thus, the rear wheel of the motorcycle is driven toward a direction to drive the motorcycle backward. When a difference having a certain value or above is caused between the torque of the main-shaft and the torque of the countershaft with the reverse gear system Bk being put in the ON state (in other words, when an engine brake is activated at a certain value or above), a force is applied to disengage the idler gear 3 from the main-shaft-side gear 1, i.e., to shift the idler gear 3 to the separation position. In the reverse gear system Bk according to this embodiment, the idler gear 3 is supported so as to be movable in the shifting direction of the shifter, i.e., with play, by the bearing apertures 41a. Accordingly, when a force is applied to push the idler gear 3 toward the separation position, the idler gear 3 can be shifted in the range of the bearing apertures 41a, preventing the shifter from being moved toward the retracted position. Thus, in such a case, it is possible to prevent a force from being applied to release the provisional holding of the holding unit 5, which set the shifter 4 in the forward position. Accordingly, in such a case, it is possible to prevent the shifter 4 from being pushed to the retracted position wherein the idler gear 3 is set in the separation position (see FIG. 5). More specifically, the idler gear 3 is intermittently reciprocating between the engagement position and the separation position until the difference between the torque of the main-shaft and the torque of the countershaft decreases to a value of not higher than the certain value. When the difference between the torques decreases to a value of not higher than the certain value, the idler gear is steady in the engagement position.

In this embodiment, in a case where the shifter 4 is set in the forward position, when the idler gear 3 is moved to such a position that the leading edge of a tooth of the idler gear 3 is brought into contact with an imaginary circle that the leading edges of the teeth of the main-shaft-side gear 1 inscribe, the shaft members 31 collide with the upper ends of the bearing apertures 41a to slightly upward shift the shifter 4 toward the retracted position by a length of z (see FIG. 5). In the shown embodiment, the ball 51a that serves as the stopper 51 at that time compresses the spring 52, being pressed from upward against the groove wall as the inclined surface 50d of the upper circumferential groove 50a of the two circumferential grooves 50a and 50b, the inclined surface being formed so as to gradually narrow the upper circumferential groove toward the bottom. Accordingly, a force to push the idler gear 3 toward the separation position is lost, i.e., when the state wherein the above-mentioned strong engine brake is activated is eliminated, the shifter 4 is downward shifted by the length of z by a force that is generated when the ball 51a returns to the bottom of the circumferential groove 50a. Further, the idler gear 3 is firmly engaged with the main-shaft-side gear 1 again by the gravity applied to the idler gear 3 (see FIG. 4).

In some of the figures, reference numeral 9 designates a safety trigger. In the shown embodiment, the safety trigger is configured that the shifter 4 is depressed toward the forward position by raising the knob of the safety trigger with the shifter 4 being set in the retracted position.

The entire disclosure of Japanese Patent Application No. 2005-217172 filed on Jul. 27, 2005 including specification, claims, drawings and summary is incorporated herein by reference in its entirety.

What is claimed is:

1. A reverse gear system for a motorcycle comprising:
a main-shaft-side gear coupled to a main shaft in a gearbox of a motorcycle;
a countershaft-side gear coupled to a countershaft in the gearbox of the motorcycle;
an idler gear constantly engaged with the countershaft-side gear;
a shifter for rotatably supporting the idler gear, locating the idler gear in a separation position to disengage the idler gear from the main-shaft-side gear when the shifter is set in a retracted position, and for locating the idler gear in an engagement position to engage the idler gear with the main-shaft-side gear when the shifter is set in a forward position; and
a holding unit for provisionally holding the shifter selectively in a state with the shifter being set in the retracted position and in a state with the shifter being set in the forward position;
wherein the idler gear is combined with the shifter so that the idler gear has a shaft member formed thereon so as to be rotatably inserted in bearing apertures formed in the shifter; and
the bearing apertures are formed so as to have a length along a shifting direction of the shifter, the length being larger than a diameter of the shaft member.

* * * * *